Figure 1:
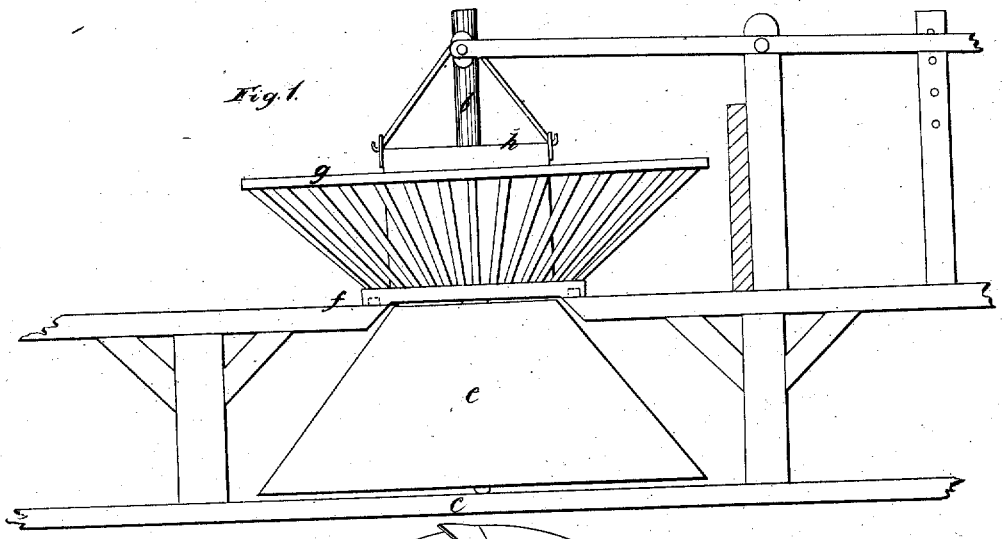
Figure 2:
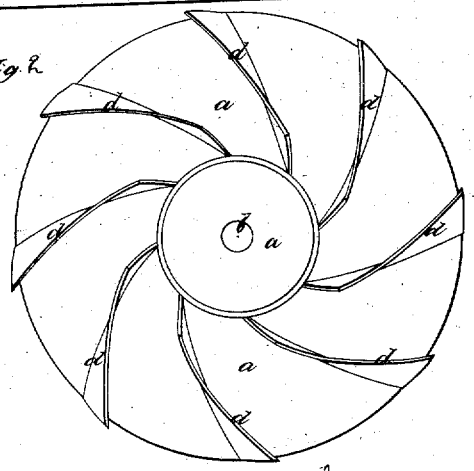
Figure 3:
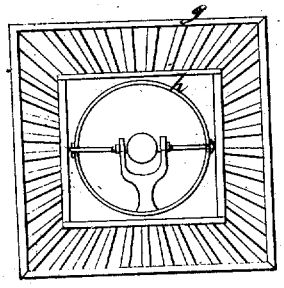
Figure 4:
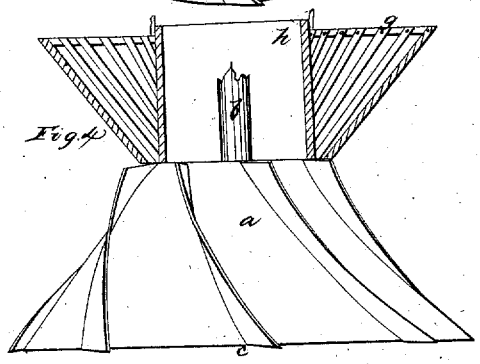

4405X

R. Wilcox,

Water Wheel,

Patented Apr. 19, 1826.

N. PETERS, PHOTO-LITHOGRAPHER, WASHINGTON, D. C.

4405X

Apr 19 1826

Roswell Wilcox
Letters Patent (Patented April 19. 1826)

The Schedule referred to in these Letters Patent and making part of the same, containing a description in the words of the said Roswell Wilcox himself of his improvement. being a conical water wheel This wheel stands in a perpendicular position; and combines the principles of action and reaction. The form of the wheel is conical and may be inclined on any scale of degrees so as to preserve the cone shape. A slope of forty five degrees however is considered the most judicious inclination of the plane. The shaft enters into the top of this cone and runs on a pivot at the bottom. On this cone are fixed buckets, from four to 12 inches wide. which are placed on the edge and wind diagonally round the cone, commencing near the top on an angle of about 45 degrees and gradually making the angle more acute as they descend the cone till they ... and parallel to the circle of the wheel. This scale of degrees may be increased or diminished, to any degree within 90° but the manner described is conceived to be the best.

The number of buckets must depend upon the head of water required power &c. and may be from 4 to 14. These buckets are closely covered from one end to the other, so as to confine the water between them. The wheel runs under the floor of the flume or forebay. This floor approaches to the mouth of the wheel on a level with it as close as possible, without obstructing its operation. A circular rack or screen (which also is so constructed as to direct the water against the face of the buckets as herein after described) is then made around the mouth of the wheel so near as merely to admit a tub gate between the screen and the mouth of the wheel as herein after mentioned. The slats of this rack or screen are made of thin plank from four to six inches wide on an angle of about 45 [illegible]

[illegible] 4405X 4-19-1826 goes from the centre which will direct the water immediately against the face of the buckets in the mouth of the wheel and gives it the first motion. The gate is like a hub surrounding the shaft and shuts down between the rack and the mouth of the wheel, or on the outside of the rack; the former method howev-er is thought most advisable

[illegible] Witnesses
[illegible] Justin H. Cooke }
Israel S. Wilcox }

Roswell Wilcox (444 words)

Drawing mad[e].